United States Patent [19]

Hasegawa et al.

[11] Patent Number: 5,166,799
[45] Date of Patent: Nov. 24, 1992

[54] SOLID-STATE IMAGING DEVICE WITH DIVIDED PIXEL SIGNAL GENERATION

[75] Inventors: Yasumasa Hasegawa; Tetsuo Tome; Kazuhiro Kawashiri, all of Kanagawa; Kazuya Oda; Masahiro Konishi, both of Tokyo, all of Japan

[73] Assignee: Fuji Photo Film Co., Ltd., Kanagawa, Japan

[21] Appl. No.: 669,537

[22] Filed: Mar. 14, 1991

[30] Foreign Application Priority Data

Mar. 16, 1990 [JP] Japan .................................. 2-64436

[51] Int. Cl.⁵ ............................................. H04N 5/335
[52] U.S. Cl. ........................... 358/213.19; 358/213.11; 358/213.15; 358/213.23
[58] Field of Search ...................... 358/213.11, 213.15, 358/213.19, 213.23, 209, 213.13, 213.24, 213.29; 357/24 LR; 377/60, 61, 62

[56] References Cited
U.S. PATENT DOCUMENTS

4,551,758 11/1985 Musunaga et al. ............. 358/213.19
4,686,573 8/1987 Murayama et al. ............ 358/213.22

Primary Examiner—Michael Razavi
Assistant Examiner—Tuan V. Ho

[57] ABSTRACT

A charge-coupled solid-state imaging device is arranged in such a manner that the pixel signal generated at each pixel is transferred through a plurality of divided transfer elements generated at each vertical charge transfer path and that the divided transferred pixel signals are synthesized at the horizontal charge transfer path and then outputted as the original pixel signal. The charge transfer capacity is therefore increased even if the width of each vertical charge transfer path is narrowed, thereby preventing blooming and dynamic range reduction. In addition, the narrowing of the width of each vertical charge transfer path allows the aperture to be increased commensurate with the degree of narrowing to thereby improve light receiving sensitivity and result in an advantageous high-resolution imaging device.

10 Claims, 10 Drawing Sheets

CHARGE TRANSFER DIRECTION

SOLID-STATE IMAGING DEVICE WITH DIVIDED PIXEL SIGNAL GENERATION

BACKGROUND OF THE INVENTION b 1. Field of the Invention

The invention relates to a high-resolution charge-coupled solid-state imaging device of an interline transfer type.

2. Description of the Background Art

A conventional solid-state imaging device has a vertical resolution conforming to, e.g., 525 scanning lines specified by standard television systems such as the NTSC (National Television System Committee) system.

However, to perform high-definition imaging applicable to higher-definition television systems, such vertical resolution of the conventional solid-state imaging device is not sufficient, and thus development of a solid-state imaging device with a larger number of pixels has been called for.

To meet such a demand with an interline transfer type charge-coupled solid-state imaging device whose vertical and horizontal resolutions are improved, the number of photodiodes, each of which corresponds to a pixel, must be increased. This in turn decreases the aperture of each photodiode, thereby causing the problem of impairing its light receiving sensitivity. If the width of each vertical charge transfer path for transferring charges is narrowed to maintain light receiving sensitivity, the charge transfer capacity must be reduced, thereby resulting in blooming and reduction of dynamic range.

SUMMARY OF THE INVENTION

The invention has been made in view of the above problems. Accordingly, an object of the invention is to provide a charge-coupled solid-state imaging device capable of preventing blooming and improving dynamic range while maintaining the aperture of each pixel.

To achieve the object, the invention is directed to a charge-coupled solid-state imaging device of an interline transfer type comprising a plurality of photoelectric conversion elements arranged in rows and columns in matrix form, each photoelectric conversion element corresponding to a pixel; a vertical charge transfer path adjacent to the photoelectric conversion elements arranged in each column; and a horizontal charge transfer path arranged at a terminal portion of each vertical charge transfer path.

When a pixel signal generated at a photoelectric conversion element is scanned, two or more transfer elements corresponding to that photoelectric conversion element are generated at each vertical charge transfer path and a field-shifting operation is performed at a timing that synchronizes with the transfer operation of each vertical charge transfer path. As a result, the scanned pixel signal of the photoelectric conversion element is divided into the generated transfer elements to be transferred to the horizontal charge transfer path and the divided pixel signals are synthesized at and outputted from the horizontal charge transfer path every horizontal scanning period.

According to the invention thus constructed, the pixel signal generated at each pixel is transferred by being divided into a plurality of transfer elements generated at each vertical charge transfer path, the divided pixel signals are then synthesized at the horizontal charge transfer path, and the synthesized pixel signal is then outputted therefrom. Therefore, the charge transfer capacity can be increased even if the width of each vertical charge transfer path is narrowed, thereby preventing blooming and reduction of dynamic range. In addition, the aperture of each pixel can be improved commensurate with the degree of narrowing of the vertical charge transfer path, thereby improving the light receiving sensitivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

Figure 1:
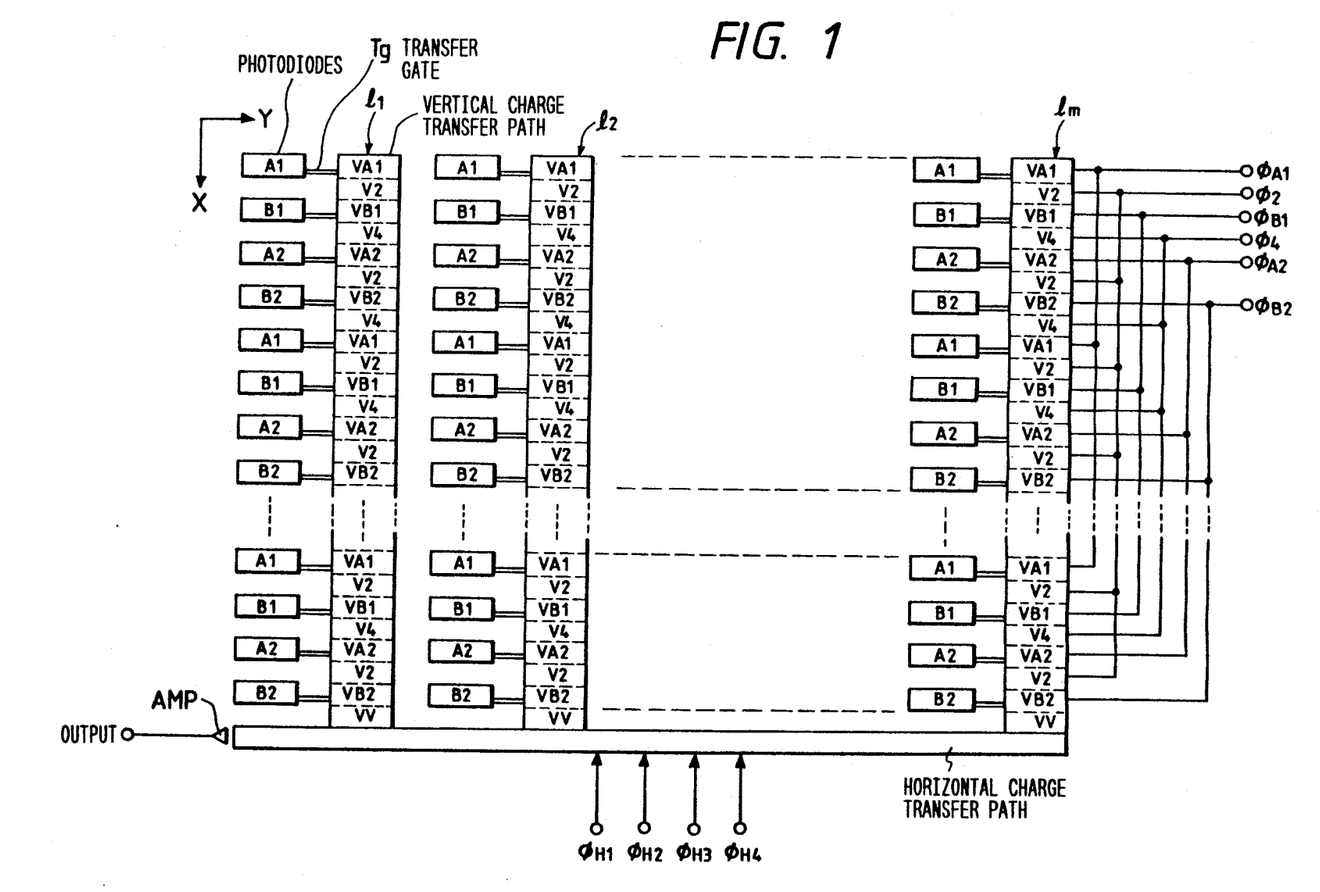
FIG. 1 is a diagram illustrating the construction of an embodiment of the invention.

The construction of a charge-coupled solid-state imaging device will be described with reference to FIG. 1. This solid-state imaging device is of a charge-coupled type prepared on a semiconductor substrate of a predetermined impurity concentration by a semiconductor integrated circuit technology. Its light receiving region has photodiodes (designated by A1, B1, A2, B2) arranged to form a matrix consisting of a total of 800,000 pixels with 1000 rows extending in a vertical direction (row direction) X and 800 columns extending in a horizontal direction (column direction) Y. Between each group of the vertically arranged photodiodes is a vertical charge transfer path, amounting to 800 paths (l1 to lm) in total. On each of the vertical charge transfer paths l1 to lm, gate electrodes VA1, V2, VB1, V4, VA2, VB2 receiving six-phase drive signals $\phi_{A1}$, $\phi_2$, $\phi_{B1}$, $\phi_4$, $\phi_{A2}$, $\phi_{B2}$ are arranged by such an interconnection as shown in FIG. 1.

As represented by reference number Tg in FIG. 1, a transfer gate is formed between each photodiode and the lateral end of each vertical charge transfer path below the gate electrode confronting such photodiode. Each gate electrode conducts when a high voltage field shift signal is applied thereto.

In addition, the terminal portions of the vertical charge transfer paths l1 to lm are commonly connected to a single horizontal charge transfer path HCCD which outputs signals to an output amplifier AMP formed at an output terminal thereof. The portion VV of each of the vertical charge transfer paths 11 to 1m that is located nearest to the horizontal charge transfer path HCCD is a gate portion for controlling the connection between the transfer element generated below the gate electrode VB2 that is located next thereto and the horizontal charge transfer path HCCD. This gate portion is controlled so as to conduct in synchronism with a predetermined timing for transferring the charges from the vertical charge transfer paths to the horizontal charge transfer path.

The output of the output amplifier AMP is to be transferred to various signal processing devices after being sampled by a sample hold circuit (not shown) which performs a correlation double sampling operation in synchronism with a point-sequential output timing.

It is defined in this embodiment that the photodiodes A1 are arranged in the first field of the first frame region; the photodiode A2, in the second field of the first frame region; the photodiode B1, in the first field of the second frame region; and the photodiode B2, in the second field of the second frame region.

The operation of such an imaging device will be described with reference to the timing charts shown in FIGS. 2–6 and the potential profiles shown in FIGS. 7–10.

The rough timings at which all the pixel signals equivalent to one frame are scanned will be described first with reference to FIG. 2. After having exposed an image to the photodiodes A1, A2, B1, B2, the pixel signal of each photodiode A1 corresponding to the first field is scanned during a first field scanning period $T_{FA1}$, shown in FIG. 2. The pixel signal of each photodiode A2 corresponding to the second field is scanned during a second field scanning period $T_{FA2}$. Then, the pixel signal of each photodiode B1 corresponding to the third field is scanned during a third field scanning period $T_{FB1}$. Finally, the pixel signal of each photodiode B2 corresponding to the fourth field is scanned during a fourth field scanning period $T_{FB2}$.

During the field scanning periods, field shifting operations (described later) are performed at periods T11, T21, T31, T41, and then the pixel signals are scanned at periods T12, T22, T32, T42, respectively. These operations are controlled by the drive signals $\phi_{A1}$, $\phi_2$, $\phi_{B1}$, $\phi_4$, $\phi_{A2}$, $\phi_{B2}$ applied to each of the vertical charge transfer paths 11 to 1m and the drive signals $\phi_{H1}$ to $\phi_{H4}$ applied to the horizontal charge transfer path HCCD.

The operation will be described according to each field scanning. It is assumed that the image has already been exposed to the photodiodes A1, A2, B1, B2.

Figure 3:
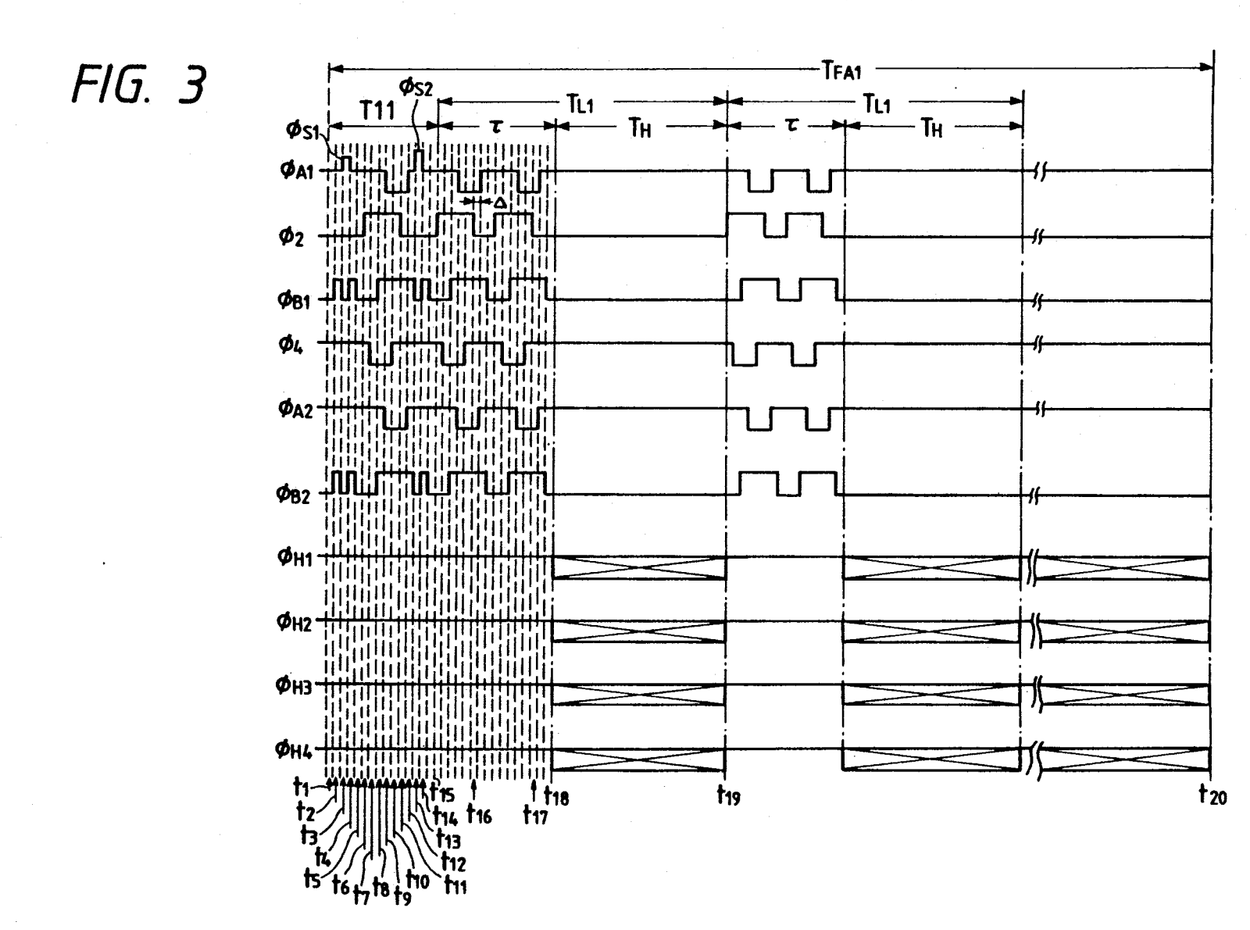
FIGS. 3-6 are timing charts illustrating the timings of field scanning operations, respectively.

The first field scanning will be described with reference to the timing chart shown in FIG. 3. In FIG. 3, the period $T_{FA1}$ designates a first field scanning period. The period T11 corresponds to a field shifting period for field-shifting a pixel signal of each photodiode A1 to each of the vertical charge transfer paths 11 to 1m. The period $T_{L1}$ corresponds to a one-cycle horizontal scanning period for horizontally scanning the pixel signals for one cycle by causing the horizontal charge transfer path HCCD to horizontally transfer the pixel signals during a period $T_H$ after each of the vertical charge transfer paths 11 to 1m has transferred the pixel signals equivalent to one horizontal line during a period $\tau$.

Figure 7:
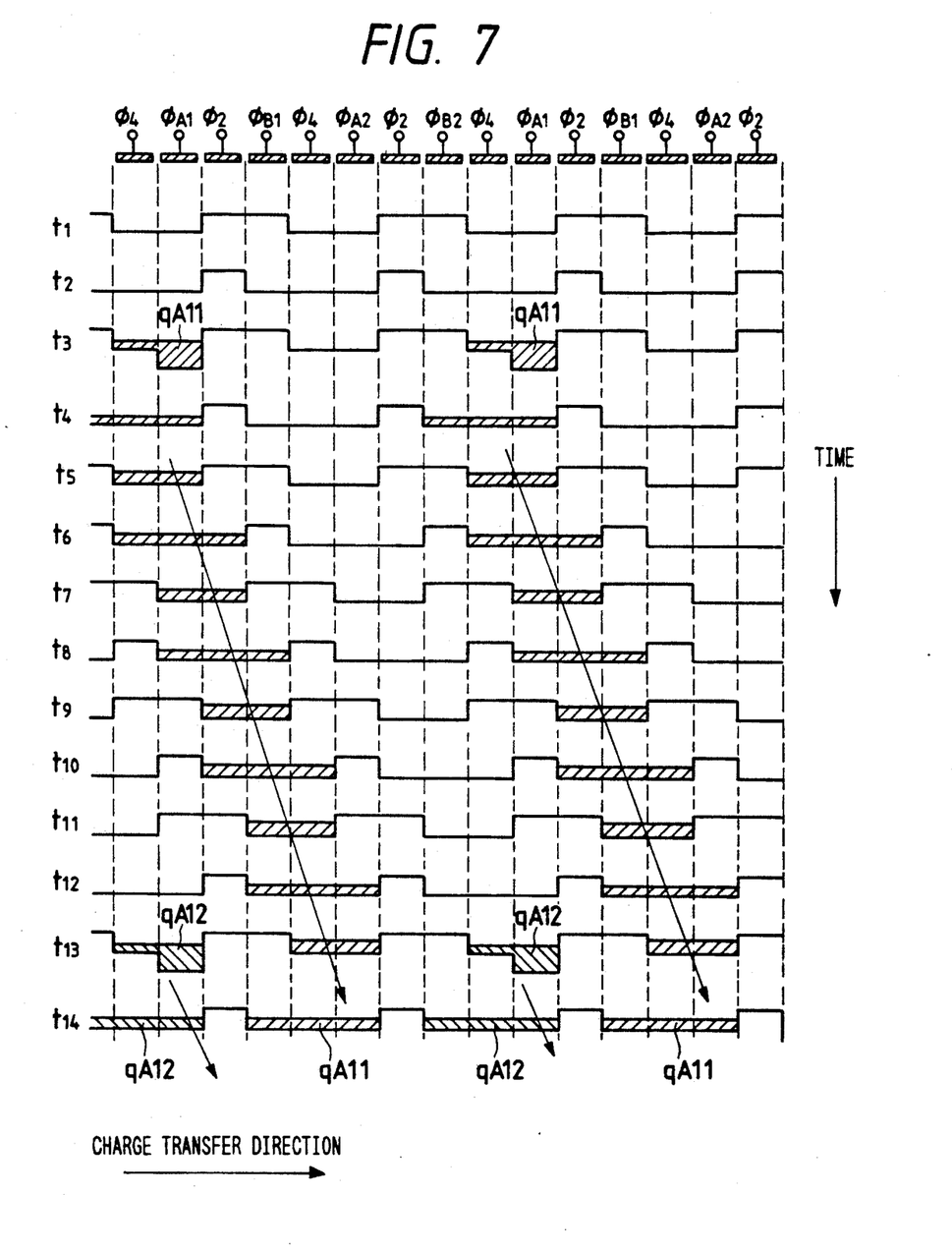
FIGS. 7-10 are potential profiles illustrating the operation of a vertical charge transfer path in correspondence with the timing charts of FIGS. 3-6.

Specifically, during the field shifting period T11, the potential profile such as shown in FIG. 7 in correspondence with times $t_1$ to $t_{14}$, is generated by applying the six-phase drive signals $\phi_{A1}$, $\phi_2$, $\phi_{B1}$, $\phi_4$, $\phi_{A2}$, $\phi_{B2}$ to each of the vertical charge transfer paths 11 to 1m as shown in FIG. 3.

Here, a high voltage field shift signal $\phi_{S1}$ is superimposed over the drive signal $\phi_{A1}$ at time $t_3$, thereby causing the transfer gate Tg to conduct. As a result, a pixel signal, designated by $q_{A11}$, of each photodiode A1 is field-shifted to a deep transfer element generated below each gate electrode VA1. The voltage of the field shift signal $\phi_{S1}$ is designed to be set to a value $P_{S1}$ in between the potential level Po of a potential barrier generated at each vertical charge transfer path and the potential level Pd of the photodiode A1 to satisfy the relation $Pd < P_{S1} < Po$. Therefore, the charge $q_{A11}$ field-shifted at time $t_3$ is equal to the difference between the potential level Po and the potential level $P_{S1}$.

The charge $q_{A11}$ is moved to the portion below each gate electrode VA2 by the transfer operation from time $t_3$ to time $t_{13}$.

Then, a high voltage field shift signal is $\phi_{S2}$ is superimposed over the drive signal $\phi_{A1}$ again at time $t_{13}$, thereby causing the transfer gate Tg to conduct. As a result, part of the pixel signal (designated by $q_{A12}$) of the photodiode A1 is field-shifted to a deep transfer element generated below the gate electrode VA1. However, the voltage of the field shift signal $\phi_{S2}$ is designed to be set to a value $P_{S2}$ in between the potential level $P_L$ of the transfer element generated at the vertical charge transfer path and the potential level Pd of the photodiode A1 to satisfy the relation $PL < P_{S2} < Pd$. Therefore, the charge $q_{A12}$ field-shifted at time $t_{13}$ constitutes the remaining capacitance of the photodiode A1, thereby completing the field shifting of the entire pixel signal ($Q_{A1}$) of the photodiode A1 by the two rounds of field shifting at times $t_3$ and $t_{13}$.

Then, each of the vertical charge transfer paths 11 to 1m transfer the pixel signals $q_{A11}$, $q_{A12}$ equivalent to a single horizontal line during the period $\tau$ from time $t_{15}$ to time $t_{18}$ in FIG. 3. Specifically, during this period $\tau$, each of the drive signals $\phi_{A1}$, $\phi_2$, $\phi_{B1}$, $\phi_4$, $\phi_{A2}$, $\phi_{B2}$ is formed of a two-cycle rectangular signal as shown in FIG. 3. With respect to the drive signal $\phi_{A1}$ that changes "H"→"L"→"H"→"L"→"H", the drive signal $\phi_2$ lags by a predetermined phase Δ. The drive signal $\phi_{B1}$ lags the drive signal $\phi_2$ by a predetermined phase Δ. The drive signal $\phi_4$ lags the drive signal $\phi_{B1}$ by a predetermined phase Δ. The drive signal $\phi_{A2}$ lags the drive signal $\phi_4$ by a predetermined phase Δ while the drive signal $\phi_{B2}$ lags the drive signal $\phi_{A2}$ by a predetermined phase Δ, with each of these drive signals having an equal waveform. When driving each of the vertical charge transfer paths 11 to 1m by the drive signals having such timings, the pixel signals $q_{A11}$, $q_{A12}$ not only are globally transferred for one horizontal line, but also a first pair of pixel signals $q_{A11}$, $q_{A12}$ that is located nearest to the horizontal charge transfer path HCCD shown in FIG. 1 is transferred to the transfer element of the horizontal charge transfer path HCCD and synthesized to be recovered as the original pixel signal $Q_{A1}$ (=$q_{A11}$+$q_{A12}$). The first charge $q_{A11}$ is transferred to the horizontal charge transfer path HCCD at the timing of time $t_{16}$ shown in FIG. 3, while the succeeding charge $q_{A12}$ is transferred to the horizontal charge path HCCD at the timing of time $t_{17}$ shown in FIG. 3.

Then, during the period $T_H$ from time $t_{18}$ to time $t_{19}$, the horizontal charge transfer path HCCD performs the horizontal transfer in synchronism with, e.g., the four-phase drive signals $\phi_{H1}$ to $\phi_{H4}$ and the pixel signals $Q_{A1}$ are read chronologically in synchronism with the transfer timing of these drive signals, i.e., the point-sequential scanning timing.

Then, the operation shown in the period $T_{L1}$ from time $t_{15}$ to time $t_{19}$ is repeated until the remaining pixel signals are all read. It is supposed, however, that the reading operation is completed at time $t_{20}$. Therefore, the period from time $t_{15}$ to time $t_{20}$ in FIG. 3 corresponds to the period T12 shown in FIG. 2.

The operation of scanning each photodiode A2 corresponding to the second field will be described with reference to the timing chart shown in FIG. 4. The period $T_{FA2}$ designates a second field scanning period while the period T21 corresponds to a field shift period for field-shifting the pixel signal of the photodiodes A2 to each of the vertical charge transfer paths 11 to 1m. The period $T_{L1}$ designates a one-cycle horizontal scanning period and the timings of the drive signals $\phi_{A1}$, $\phi_2$, $\phi_{B1}$, $\phi_4$, $\phi_{A2}$, $\phi_{B2}$, $\phi_{H1}$, $\phi_{H2}$, $\phi_3$, $\phi_{H4}$ during the periods $\tau$ and $T_H$ are the same as those during the periods $\tau$ and $T_H$ shown in FIG. 3.

Figure 4:
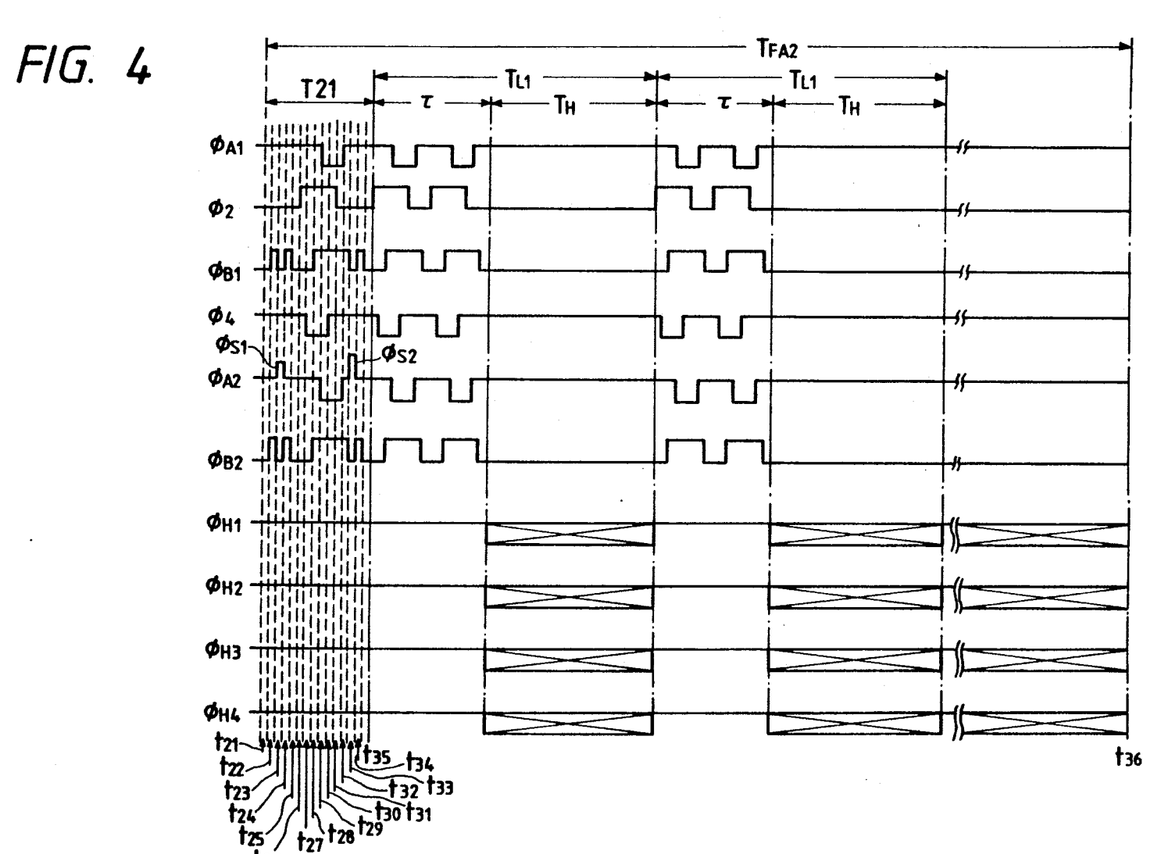
Figure 8:
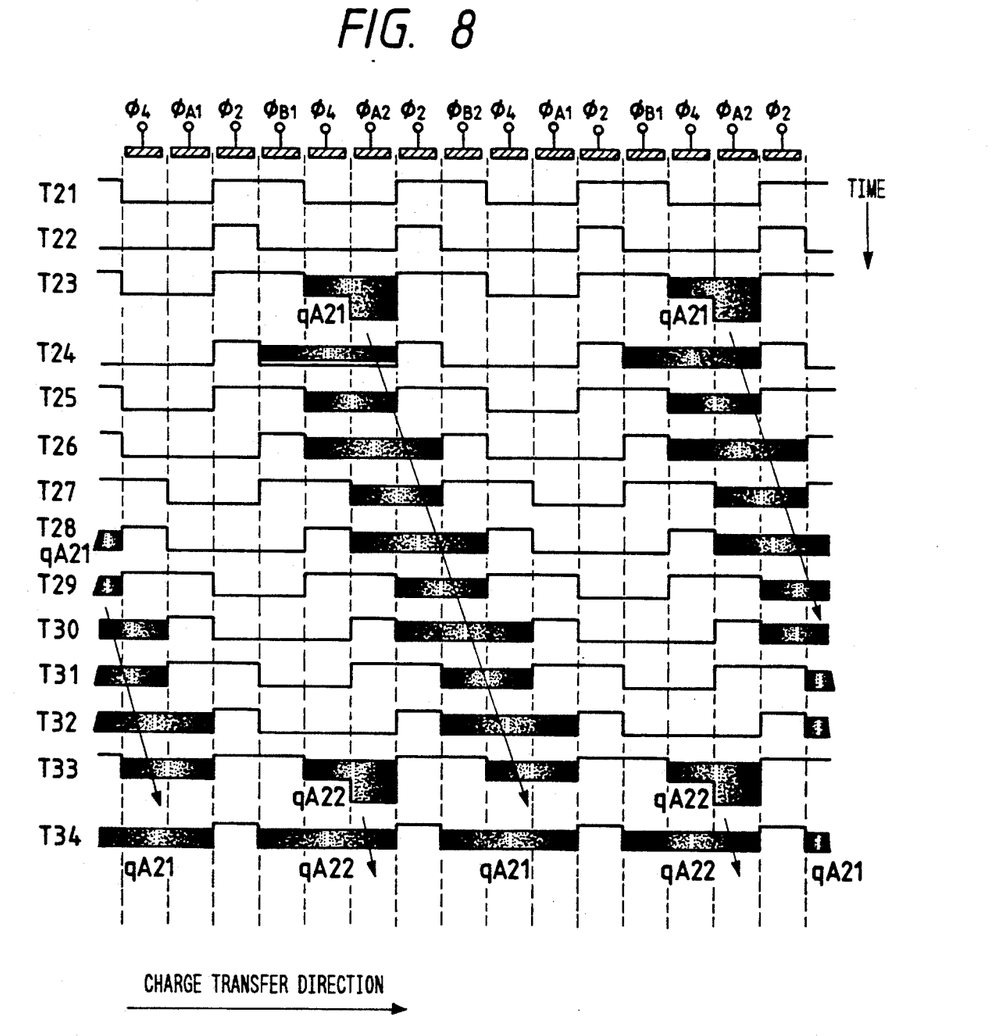

First, during the field shift period T21, the potential profile such as shown in FIG. 8 in correspondence with times $t_{21}$–$t_{34}$ is generated by applying the six-phase drive signals $\phi_{A1}$, $\phi_2$, $\phi_{B1}$, $\phi_4$, $\phi_{A2}$, $\phi_{B2}$ to each of the vertical charge transfer paths 11 to 1m as shown in FIG. 4.

Here, a high voltage field shift signal $\phi_{S1}$ is superimposed over the drive signal $\phi_{A2}$ at time $t_{23}$, thereby causing the transfer gate Tg to conduct. As a result, a pixel signal, designated by $q_{A21}$, of the photodiode A2 is field-shifted to a deep transfer element generated below the gate electrode VA2. However, the voltage of the field shift signal $\phi_{S1}$ is designed to be set to a value $P_{S1}$ in between the potential level Po of the potential barrier generated at the vertical charge transfer path and the potential level Pd of the photodiode A2 to satisfy the relation $Pd < P_{S1} < Po$. Therefore, the charge $q_{A21}$ field-shifted at time $t_{23}$ is equal to the difference between the potential level Po and the potential level $P_{S1}$.

The charge $q_{A21}$ is moved to the portion below the gate electrode VA1 by the transfer operation from time $t_{23}$ to time $t_{33}$.

Then, a high voltage field shift signal $\phi_{S2}$ is superimposed on the drive signal $\phi_{A2}$ again at time $t_{33}$, thereby causing the transfer gate Tg to conduct. As a result, part of the pixel signal, designated by $q_{A22}$, of the photodiode A2 is field-shifted to a deep transfer element generated below the gate electrode VA2. However, the voltage of the field shift signal $\phi_{S2}$ is designed to be set to a value $P_{S2}$ in between the potential level $P_L$ of the transfer element generated at each of the vertical charge transfer paths and the potential level Pd of the photodiode A2 to satisfy the relation $PL < P_{S2} < Pd$. Therefore, the charge $q_{A22}$ field-shifted at time $t_{33}$ constitutes the remaining capacitance of the photodiode A2, thereby completing the field shifting of the entire pixel signal ($Q_{A2}$) of the photodiode A2 by the two rounds of field shifting at times $t_{23}$ and $t_{33}$.

Figure 2:
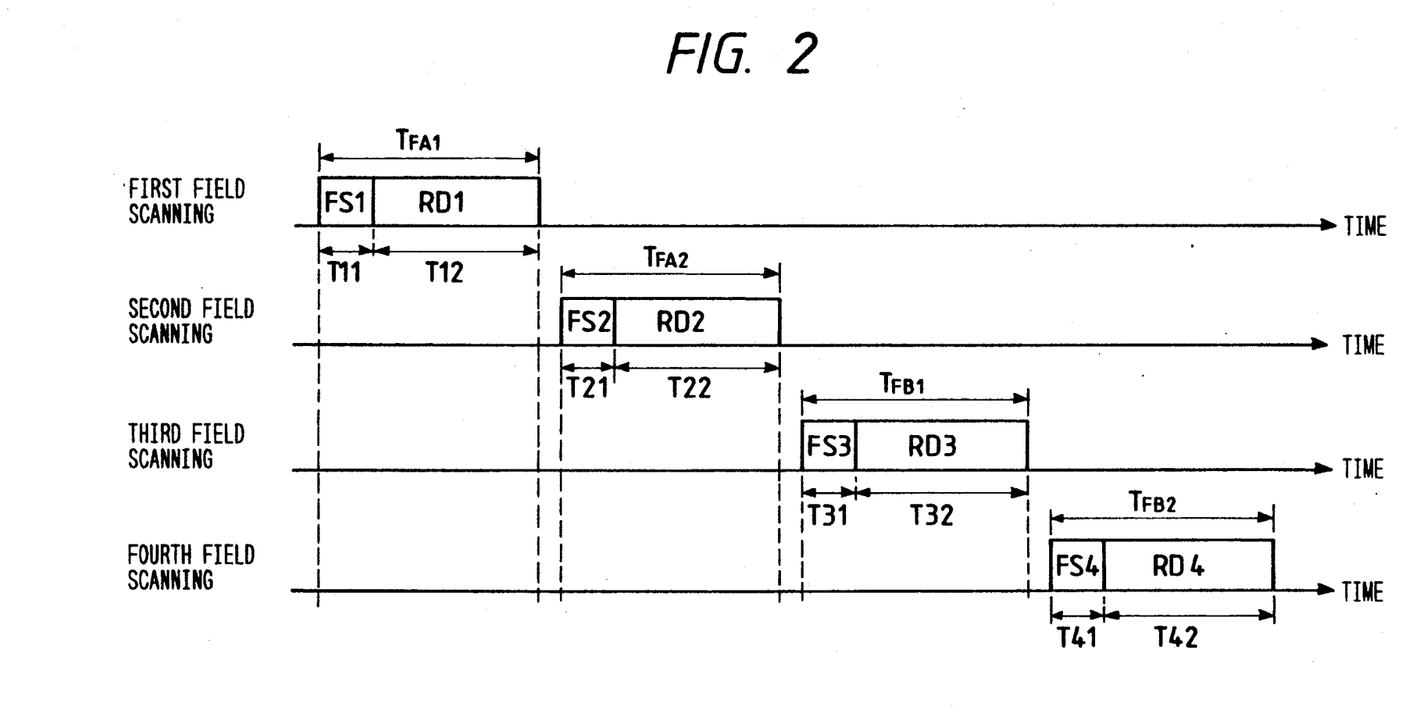
FIG. 2 is a timing chart illustrating the operation of the embodiment shown in FIG. 1.

Then, the same scanning operation as that at the first field scanning period from time $t_{15}$ to time $t_{20}$ shown in FIG. 3 is performed during the period from time $t_{35}$ to time $t_{36}$ in FIG. 4, corresponding to the period T22 in FIG. 2. As a result, the pixel signals $Q_{A2}$ are read chronologically from the horizontal charge transfer path HCCD and thus the second field scanning operation is completed.

The operation of scanning each photodiode B1 corresponding to the third field will be described with reference to the timing chart shown in FIG. 5. The period $T_{FB1}$ designates a third field scanning period and the period T31 corresponds to a field shift period for field-shifting the pixel signal of the photodiodes B1 to each of the vertical charge transfer paths 11 to 1m. The period $T_{L1}$ designates a one-cycle horizontal scanning period and the timings of the drive signals $\phi_{A1}$, $\phi_2$, $\phi_{B1}$, $\phi_4$, $\phi_{A2}$, $\phi_{B2}$, $\phi_{H1}$, $\phi\phi_{H2}$, $\phi_{H3}$, $\phi_{H4}$ during the periods $\tau$ and $T_H$ are the same as those during the periods $\tau$ and $T_H$ shown in FIG. 3.

Figure 5:
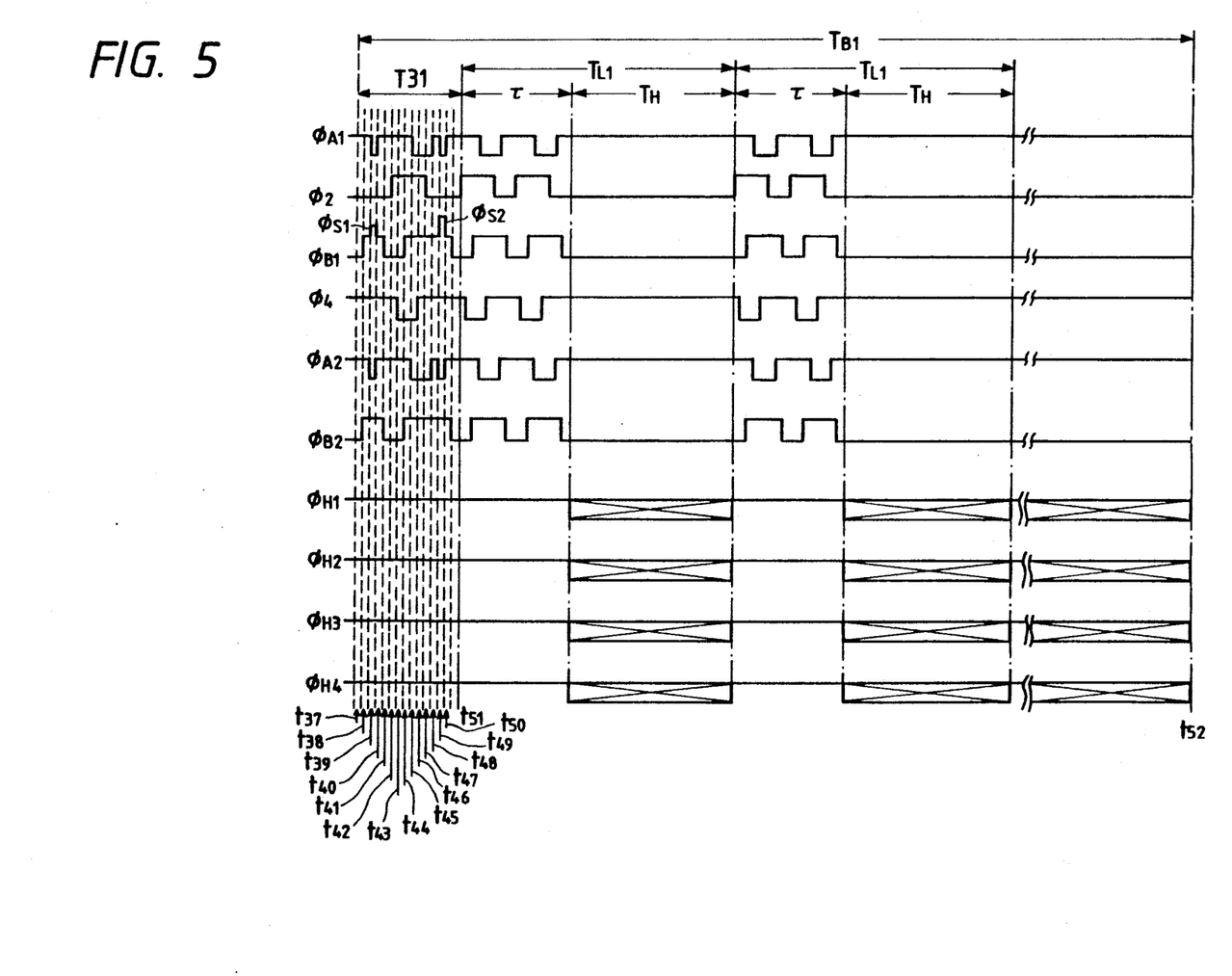
Figure 9:
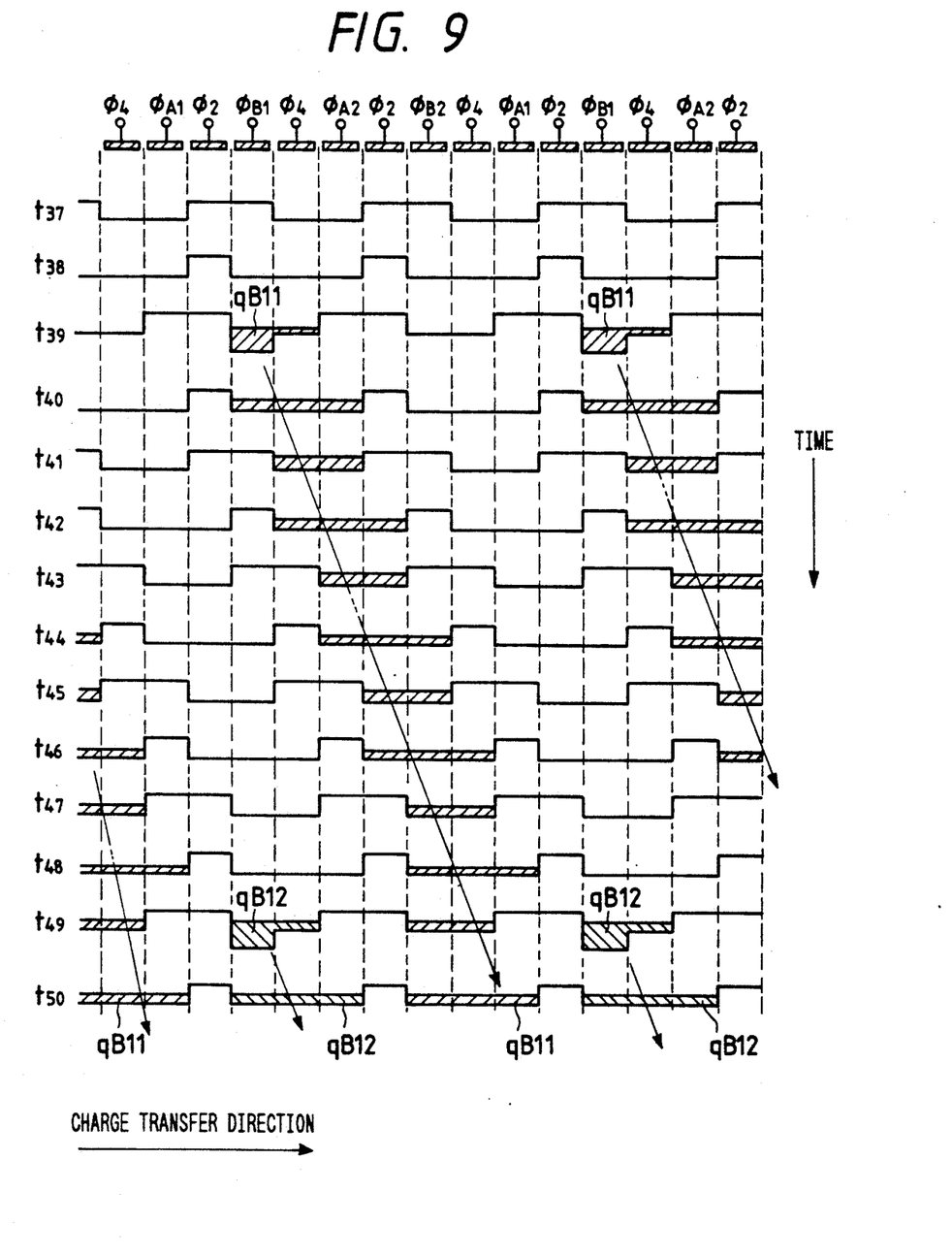

First, during the field shift period T31, the potential profile such as shown in FIG. 9 in correspondence with times $t_{37}$–$t_{50}$ is generated by applying the six-phase drive signals $\phi_{A1}$, $\phi_2$, $\phi_{B1}$, $\phi_4$, $\phi_{A2}$, $\phi_{B2}$ to each of the vertical charge transfer paths 11 to 1m as shown in FIG. 5.

Here, a high voltage field shift signal $\phi_{S1}$ is superimposed over the drive signal $\phi_{B1}$ at time $t_{39}$, thereby causing the transfer gate Tg to conduct. As a result, a pixel signal, designated by $q_{B11}$, of the photodiode B1 is field-shifted to a deep transfer element generated below the gate electrode VB1. However, the voltage of the field shift signal $\phi_{S1}$ is designed to bet set to a value $P_{S1}$ in between the potential level Po of the potential barrier generated at the vertical charge transfer path and the potential level Pd of the photodiode B1 to satisfy the relation $Pd < P_{S1} < Po$. Therefore, the charge $q_{B11}$ field-shifted at time $t_{39}$ is equal to the difference between the potential level Po and the potential level $P_{S1}$.

The charge $q_{B11}$ is moved to the portion below the gate electrode VB2 by the transfer operation from time $t_{39}$ to time $t_{49}$.

Then, a high voltage field shift signal $\phi_{S2}$ is superimposed over the drive signal $\phi_{B1}$ again at time $t_{49}$, thereby causing the transfer gate Tg to conduct. As a result, part of the pixel signal, designated by $q_{B12}$, of the photodiode B1 is field-shifted to a deep transfer element generated below the gate electrode VB1. However, the voltage of field shift signal $\phi_{S2}$ is designed to be set to a value $P_{S2}$ in between the potential level $P_L$ of the transfer element generated at each of the vertical charge transfer paths and the potential level Pd of the photodiode B1 to satisfy the relation $PL < P_{S2} < Pd$. Therefore, the charge $q_{B12}$ field-shifted at time $t_{49}$ constitutes the remaining capacitance of the photodiode B1, thereby completing the field shifting of the entire pixel signal ($Q_{B1}$) of the photodiode B1 by the two rounds of field-shifting at times $t_{39}$ and $t_{49}$.

Then, the same scanning operation as that at the first field scanning period from time $t_{15}$ to time $t_{20}$ shown in FIG. 3 is performed during the period from time $t_{51}$ to time $t_{52}$ in FIG. 5, corresponding to the period T32 in FIG. 2. As a result, the pixel signals $Q_{B1}$ are read chronologically from the horizontal charge transfer path HCCD and thus the third field scanning is completed.

The operation of scanning each photodiode B2 corresponding to the fourth field will be described with reference to the timing chart shown in FIG. 6. The period $T_{FB2}$ designates a fourth field scanning period and the period T41 corresponds to a field shift period for field-shifting the pixel signals of the photodiode B2 to each of the vertical charge transfer paths 11 to 1m. The period $T_{L1}$ designates a one-cycle horizontal scanning period and the timings of the drive signals $\phi_{A1}$, $\phi_2$, $\phi_{B1}$, $\phi_4$, $\phi_{A2}$, $\phi_{B2}$, $\phi_{H1}$, $\phi_{H2}$, $\phi_{H3}$, $\phi_{H4}$ during the periods $\tau$ and $T_H$ are the same as those during the periods $\tau$ and $T_H$ shown in FIG. 3.

Figure 6:
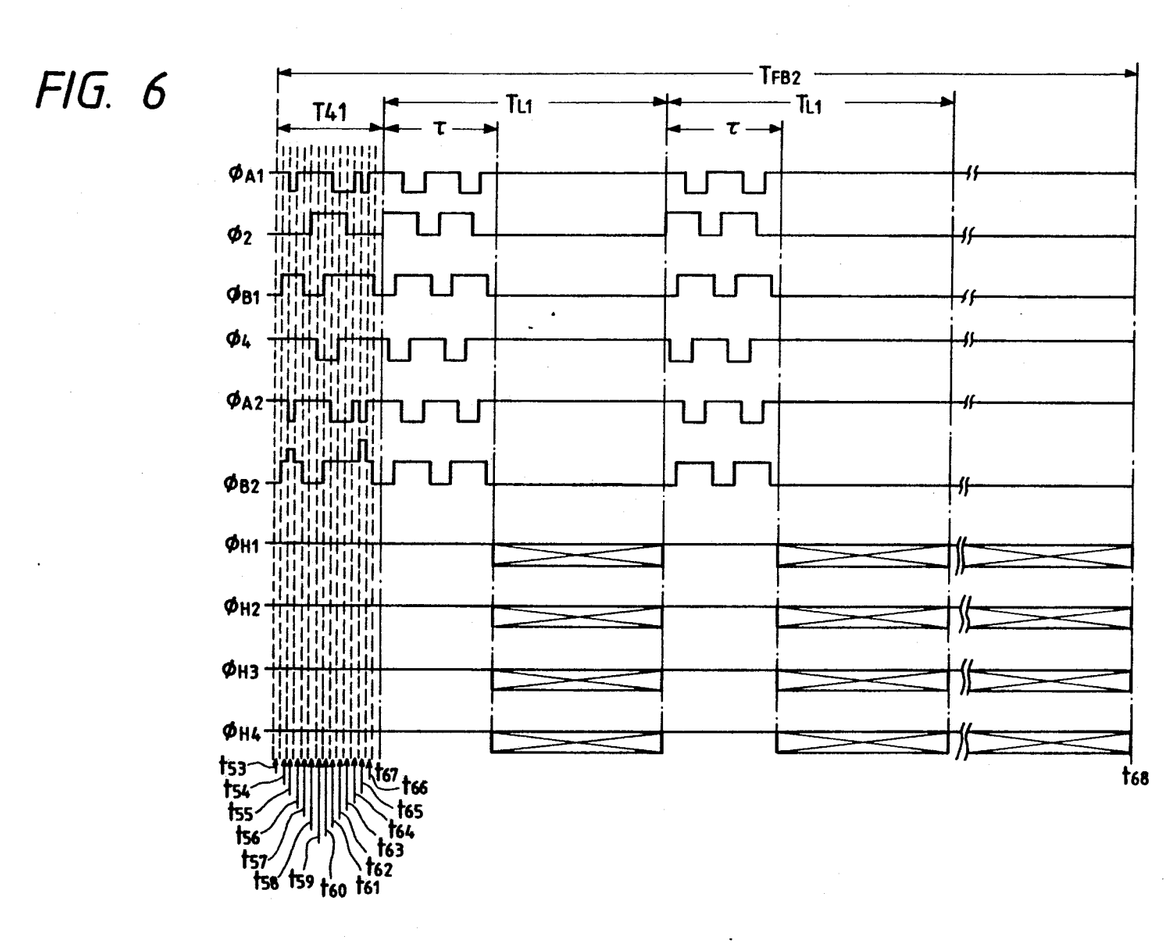
Figure 10:
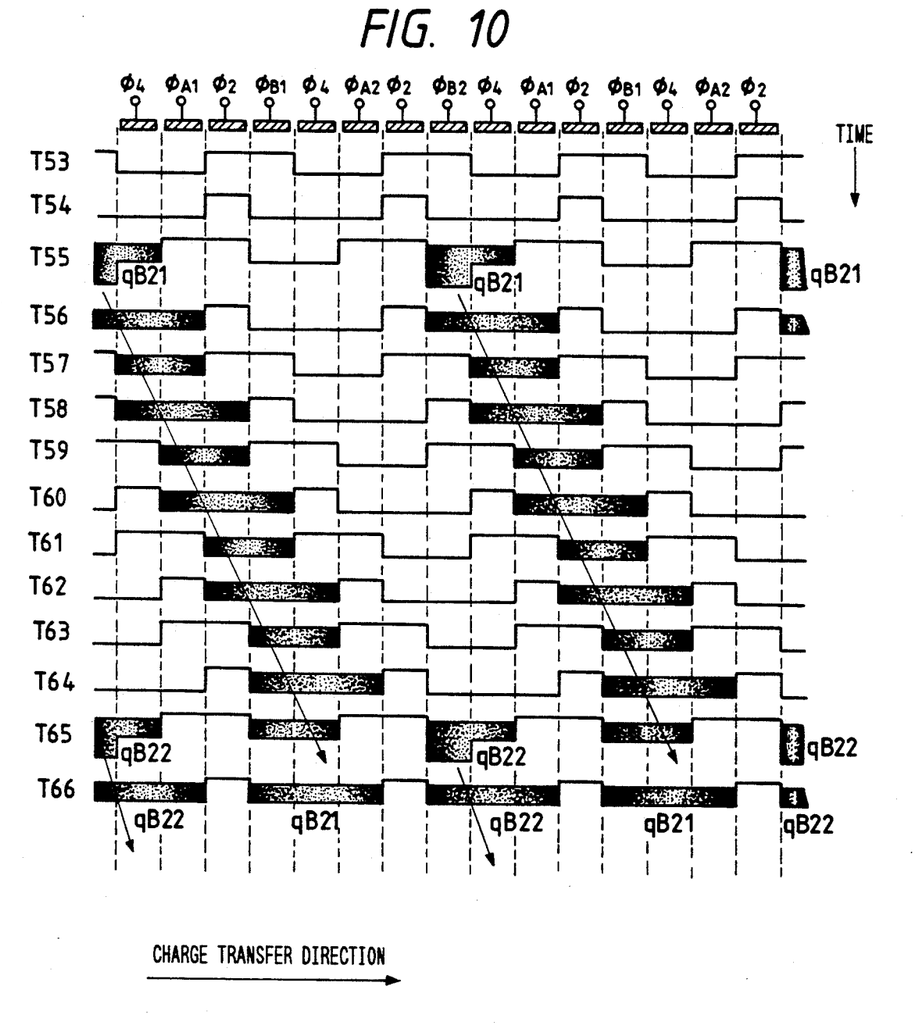

First, during the field shift period T41, the potential profile such as shown in FIG. 10 in correspondence with times $t_{53}$–$t_{66}$ is generated by applying the six-phase drive signals $\phi_{A1}$, $\phi_2$, $\phi_{B1}$, $\phi_4$, $\phi_{A2}$, $\phi_{B2}$ to each of the vertical charge transfer paths 11 to 1m as shown in FIG. 6.

Here, a high voltage field shift signal $\phi_{S1}$ is superimposed over the drive signal $\phi_{B2}$ at time $t_{55}$, thereby causing the transfer gate Tg to conduct. As a result, a pixel signal, designated by $q_{B21}$, of the photodiode B2 is field-shifted to a deep transfer element generated below the gate electrode VB2. However, the voltage of the fields shift signal $\phi_{S1}$ is designed to be set to a value $P_{S1}$ in between the potential level Po of the potential barrier generated at the vertical charge transfer path and the potential level Pd of the photodiode B2 to satisfy the relation $Pd < P_{S1} < Po$. Therefore, the charge $q_{B21}$ field-shifted at time $t_{55}$ is equal to the difference between the potential level Po and the potential level $P_{S1}$.

The charge $q_{B21}$ is moved to the portion below the gate electrode VB1 by the transfer operation from time $t_{55}$ to time $t_{65}$.

Then, a high voltage field shift signal $\phi_{S2}$ is superimposed over the drive signal $\phi_{B2}$ again at time $t_{65}$, thereby causing the transfer gate Tg to conduct. As a result, part of the pixel signal, designated by $q_{B22}$, of the photodiode B2 is field-shifted to a deep transfer element generated below the gate electrode VB2. However, the voltage of the field shift signal $\phi_{S2}$ is designed to be set to a value $P_{S2}$ in between the potential level $P_L$ of the transfer element generated at the vertical charge transfer path and the potential level Pd of the photodiode B2 to satisfy the relation $P_L < P_{S2} < Pd$. Therefore, the charge $q_{B22}$ field-shifted at time $t_{65}$ constitutes the remaining capacitance of the photodiode B2, thereby completing the field shifting of the entire pixel signal ($Q_{B2}$) of the photodiode B2 and by the two rounds of field shifting at times $t_{55}$ and $t_{65}$.

Then, the same scanning operation as that at the first field scanning period from time $t_{15}$ to time $t_{20}$ shown in FIG. 3 is performed during the period from time $t_{67}$ to time $t_{68}$ in FIG. 6, corresponding to the period T42 in FIG. 2. As a result, the pixel signals $Q_{B2}$ are read chronologically from the horizontal charge transfer path HCCD and thus the fourth field scanning operation is completed.

As described above, this embodiment is arranged not only to read the pixel signals equivalent to one frame by four rounds of field scanning, but also to transfer each pixel signal to the vertical charge transfer paths by dividing it into two parts during the field shift period of each field scanning, and thereafter recover the divided parts into the original pixel signal by synthesizing them at the horizontal charge transfer path. Therefore, it is possible to transfer a large volume of pixel signals easily even if the width of each vertical charge transfer path is narrowed. As a result, problems such as blooming and dynamic range reduction can be overcome. Furthermore, light receiving sensitivity can be improved by increasing the aperture of each photodiode that corresponds to a pixel.

In addition, this embodiment can be used as image sensors for imaging with a high resolution applicable to high-definition television systems (HDTV).

While each vertical charge transfer path is described as driven by the six-phase drive signals in this embodiment, the driving system is not limited thereto but may be other multi-phase driving systems applicable to transferring a pixel signal generated at each photodiode by dividing it into a plurality of parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An interline transfer type charge-coupled solid-state imaging apparatus comprising:

a plurality of photoelectric conversion elements for generating pixel signals after exposure to an image, said photoelectric conversion elements arranged in rows and columns in matrix form and each corresponding to a pixel;

a plurality of vertical charge transfer paths, corresponding in number to said columns, each coupled to a respective column of said photoelectric conversion elements through a plurality of transfer gates, for receiving and transferring said generated pixel signals in a vertical direction; and a horizontal charge transfer path, coupled to end portions of said vertical charge transfer paths and receiving said vertically transferred pixel signals, for synthesizing and transferring said received vertically transferred pixel signals in a horizontal direction, said generated pixel signals of said photoelectric conversion elements each comprising two or more pixel signal transfer elements synchronously transferred to corresponding ones of said vertical charge transfer paths to be transferred separately to said horizontal charge transfer path and synthesized as a corresponding original pixel signal of a respective photoelectric conversion element to prevent blooming.

2. The interline transfer type charge-coupled solid-state imaging apparatus of claim 1, said generated pixel signals each comprising first and second pixel signal transfer elements, p1 said first pixel signal transfer element transferred from a respective one of said photoelectric conversion elements to a corresponding one of said vertical charge transfer paths through one of said transfer gates in response to a first field shift signal of potential level $P_{S1}$ applied to a gate electrode of said corresponding vertical charge transfer path immediately adjacent said one transfer gate, said second pixel signal transfer element transferred from said respective photoelectric conversion element to said corresponding vertical charge transfer path through said one transfer gate in response to a second field shift signal of potential level $P_{S2}$ applied to said gate electrode, said potential levels $P_{S1}$ and $P_{S2}$ being unequal.

3. The interline transfer type charge-coupled solid-state imaging apparatus of claim 2, said photoelectric conversion elements comprising photodiodes.

4. The interline transfer type charge-coupled solid-state imaging apparatus of claim 3, said potential level $P_{S1}$ being set to a value between a potential level $P_0$ of a potential barrier generated at said vertical charge transfer paths and a potential level $P_d$ of said photodiodes, said potential level $P_{S2}$ being set to a value between a potential level $P_L$ of a pixel signal transfer element generated at said vertical charge transfer paths and said potential level $P_d$ of said photodiodes.

5. The interline transfer type charge-coupled solid-state imaging apparatus of claim 4, said potential level $P_{S1}$ set to a value to satisfy the relation $P_d < P_{S1} < P_0$ and said potential level $P_{S2}$ set to a value to satisfy the relation $P_L < P_{S2} < P_d$.

6. An imaging method for use in an interline transfer type charge-coupled solid-state imaging apparatus comprising the steps of:

generating pixel signals in a plurality of photoelectric conversion elements, arranged in rows and columns in matrix form and each corresponding to a pixel, after exposure to an image;

transferring the generated pixel signals from the photoelectric conversion elements to a plurality of vertical charge transfer paths, equal in number to the columns and each being coupled to a respective one of the columns of the plurality of photoelectric conversion elements, through a plurality of transfer gates;

vertically transferring the transferred pixel signals along the vertical charge transfer paths to a horizontal charge transfer path; and synthesizing the vertically transferred pixel signals in the horizontal charge transfer path and transferring the synthesized signals horizontally as processed image signals, said step of generating the pixel signals comprising generating two or more pixel signal transfer elements for each one of the photoelectric conversion elements, the pixel signal transfer elements of a respective photoelectric conversion element being separately transferred to the horizontal charge transfer path and synthesized as an original pixel signal of the respective photoelectric conversion element to prevent blooming.

7. The imaging method of claim 6, said step of generating the pixel signals comprising:

generating first and second pixel signal transfer elements for each one of the photoelectric conversion elements.

8. The imaging method of claim 7, said step of transferring the generated pixel signals from the photoelectric conversion elements each comprising the steps of:

applying a first field shift signal of potential level $P_{S1}$ to a gate electrode of a corresponding one of the vertical charge transfer paths to transfer the first pixel signal transfer element from a respective one of the photoelectric conversion elements to the corresponding vertical charge transfer path through one of the transfer gates; and applying a second field shift signal of a potential level $P_{S2}$ to the gate electrode of the corresponding vertical charge transfer path to transfer the second pixel signal transfer element from the respective photoelectric conversion element to the corresponding vertical charge transfer path through the one transfer gate, the potential levels $P_{S1}$ and $P_{S2}$ being unequal.

9. The imaging method of claim 8, the photoelectric conversion elements comprised of photodiodes, said step of transferring the generated pixel signals from the photoelectric conversion elements further comprising the steps of:

setting the potential level $P_{S1}$ to a value between a potential level $P_0$ of a potential barrier generated at the vertical charge transfer paths and a potential level $P_d$ of the photodiodes; and setting the potential level $P_{S2}$ to a value between a potential level $P_L$ of a pixel signal transfer element generated at the vertical charge transfer paths and the potential level $P_d$ of the photodiodes.

10. The imaging method of claim 9, said step of transferring the generated pixel signals from the photoelectric conversion elements further comprising the steps of:

setting the potential level $P_{S1}$ to a value to satisfy the $P_d < P_{S1} < P_0$ and setting the potential level $P_{S2}$ to a value to satisfy the relation $P_L < P_{S2} < P_d$.

* * * * *